United States Patent [19]

Dees, Jr. et al.

[11] Patent Number: 5,308,683

[45] Date of Patent: * May 3, 1994

[54] LAMINATE HAVING TEXTURED WEAR SURFACE AND PROCESS OF PREPARATION

[76] Inventors: Martin Dees, Jr., 779 Eastside Dr., Landisville, Pa. 17538; George A. Edelen, 2923 Marietta Ave., Lancaster, Pa. 17601; Beth M. Hess, 34 E. Main St., Mountville, Pa. 17554; Barbara L. Laukhuff, 4094 Hilltop Dr., Mount Joy, Pa. 17552

[*] Notice: The portion of the term of this patent subsequent to Jul. 27, 2010 has been disclaimed.

[21] Appl. No.: 7,903

[22] Filed: Jan. 22, 1993

Related U.S. Application Data

[63] Continuation of Ser. No. 615,274, Nov. 19, 1990, abandoned.

[51] Int. Cl.⁵ .................................................. B32B 9/00
[52] U.S. Cl. .................................... 428/195; 428/913.3; 428/542.2; 428/542.6; 428/156; 428/908.8
[58] Field of Search ............... 428/908.8, 913.3, 542.2, 428/542.6, 156, 195

Primary Examiner—Patrick J. Ryan
Assistant Examiner—Kam F. Lee

[57] ABSTRACT

A glass-fiber product having a textured surface thereon (and its process of manufacture) is disclosed wherein the textured surface is obtained by relieving the stress in pre-stressed polymeric chips that have been distributed throughout a polymeric layer superimposed on a glass-fiber sheet.

2 Claims, 2 Drawing Sheets

LAMINATE HAVING TEXTURED WEAR SURFACE AND PROCESS OF PREPARATION

CROSS-REFERENCE TO RELATED APPLICATION

This is a continuation of application Ser. No. 07/615,274, filed Nov. 19, 1990 is now abandoned.

FIELD OF THE INVENTION

The present invention relates to decorative laminates that are suitable as surface coverings for floors, walls, etc., and, more particularly, the invention is directed to a decorative laminate having surface texture for improving the wear resistance of the laminate.

BACKGROUND OF THE INVENTION

Decorative laminates used as surface coverings for floors are well-known in the art and have achieved broad use in both domestic and commercial environments. These laminates in the form of sheet material composed of a resinous polymer composition, e.g., polyvinyl chloride, laminated to a suitable substrate, e.g., a fibrous backing sheet, have been used for many years as sheet flooring. To illustrate, many methods and processes such as mechanical embossing, chemical embossing or inlaying have been utilized to provide contrasting surface finishes and thereby impart decorative effects to the sheet flooring. For example, U.S. Pat. Nos. 3,000,754 and 4,456,643 each discloses different techniques or means for making floor covering products such as floor tiles or sheet flooring having decorative surface effects. A goal common for all these products is to combine attractive surface decorative effects from an aesthetic viewpoint with substantial wear resistance from a functional standpoint.

In U.S. Pat. No. 3,000,754, the embossed effect is obtained by hot pressing at least two PVC resins of different molecular weights. The higher molecular weight resin has a greater tendency to relax in a direction normal to the plane of the surface covering to provide the textured effect.

In U.S. Pat. No. 4,456,613, the laminate has an embossed surface composed of raised segments containing PVC particles adjoining recessed segments devoid of PVC particles. Similar articles are disclosed in U.S. Pat. Nos. 4,599,264 and 4,450,194.

In U.S. Pat. No. 4,405,657, a non-skid plastic floor covering is disclosed wherein slip-resistant particles are embedded in a cured plastic matrix with the uppermost layer of particles protruding from the matrix. A clear or translucent wear layer coats the outer surface.

U.S. Pat. Nos. 4,816,317 and 4,816,319 disclose the use of discrete portions of a thixotropic plastic material containing solid material to provide the raised elements of the textured surface.

U.S. Pat. No. 4,348,447 discloses a non-skid plastic flooring product in which inorganic particles are applied to the adhesive surface of a plastic matrix and then embedded into the matrix by pressure. However, particles applied in this manner do not penetrate uniformly throughout the matrix. Furthermore, to obtain complete bonding of the particles to the plastic matrix, a thin coating is applied over the surface. This step tends to fill the interstitial areas between raised particles and reduce the textured effect on the surface. The use of such particles also tends to obscure any underlying decorative portion that may be imposed on a substrate that supports the plastic matrix containing the particles.

SUMMARY OF THE INVENTION

It is an object of the present invention to provide a decorative laminate having a textured wear surface that avoids the difficulties typically associated with the use of particles that are pressed into the surface of the laminate.

It is also an object of the present invention to provide the textured wear surface in a cost-effective process that minimizes the required steps while still insuring success.

According to the present invention, there is provided a decorative laminate having a textured wear surface suitable as a floor or wall covering comprising:

1) a substrate, optionally having a printed image thereon, comprising a glass fiber layer impregnated with a synthetic organic polymer;

2) a layer of a substantially transparent synthetic organic polymer superimposed on the substrate and preferably adhered or bonded to the substrate; and 3) a plurality of polymeric chips distributed throughout and embedded in the organic polymer layer, the chips having been stressed prior to embedding and relaxed thereafter to provide a textured effect to the surface of the laminate.

Specifically, the polymeric chips, that are in the organic polymer layer, are "stress-embedded induced" chips that have been stretched lengthwise, while relatively solid after cooling from the molten stage, to an extent of at least twice its original length; and then, after being embedded or at least partially embedded, laid flat in the soft organic polymer layer and coated, the stressed chips are permitted to relax or contract, usually by heating the structure at or above the original stretching temperature but below the melting temperature of the organic polymer. During the heating, the chips tend to contract or "pop" to provide the desired textured effect on the surface of the product while still remaining coated with the wear resistant polymeric coating.

To insure that all chips are completely embedded in the polymeric layer before the heat treatment, it is recommended that a thin coating compatible with the polymeric layer (usually the same composition as the polymeric layer) be applied over the chips prior to relaxing to protect them and the surface of the structure from wear and dirt and also to fill any potential dirt-collecting recesses that may have developed during the production process.

DETAILED DESCRIPTION OF THE INVENTION

Figure 1:
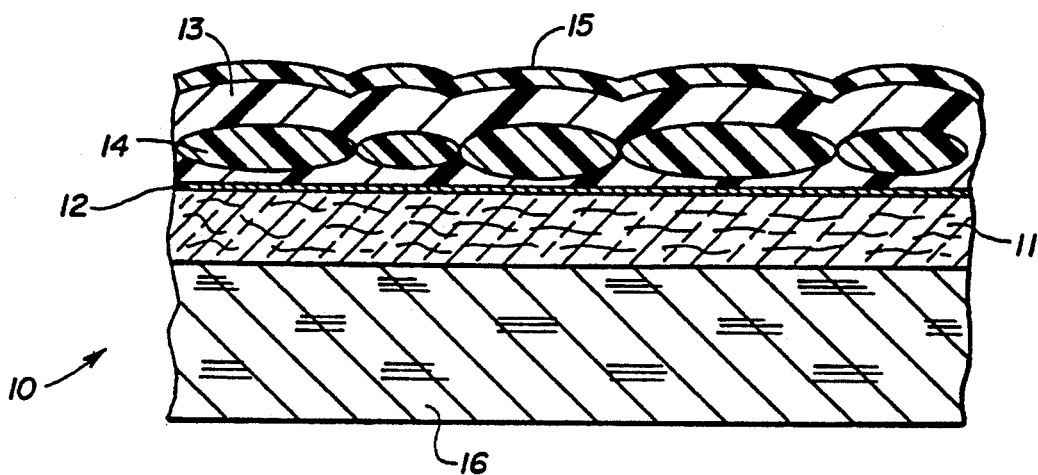
FIG. 1 is a cross-sectional view depicting the arrangement of elements and structural features of the product of the invention.

FIG. 1 depicts the decorative laminate product 10 of the invention in cross-section. The laminate is composed of three basic layers: the back coat layer 16, the substrate layer 11 and the surface or wear layer 18 that includes the texture-producing chips 14 embedded therein. An optional layer 12 composed of a thin clear coat of plastisol may be applied to the surface of the substrate layer 11 if the surface is printed with rotogravure or other printing techniques that impart color and pattern to the product.

The substrate 11 is preferably a glass fabric impregnated and coated with a plastisol to seal the glass fibers. The substrate 11 comprises anywhere from 10 to 30 mils of the approximately 80–100 mils thick product.

It should be understood that any of the substrates normally employed in the surface covering field may be employed to prepare the laminate of this invention. It should be a strong, durable and flexible material. Thus, any woven, felted or solid sheet of synthetic or natural material may be used as substrate 11.

Since substrate 11 in the figure is an impregnated glass mat, it is usual to provide one or more seal or back coats 16 to a thickness of about 25-35 mils. This coat 16 is conveniently applied in the form of an aqueous emulsion of resinous binder and, optionally, filler. The resinous compound is preferably a vinyl resin.

The surface or wear layer 18 is usually, although not necessarily, applied in two steps; one step before the particles 14 are deposited and the optional second step after the particles 14 are deposited. The wear layer 18 may be anywhere from 20 to 40 mils thick, usually about 25 to 30 mils; and the chips 14 are from 2–20 mils in their shorter dimension, usually about 10 mils thick.

The resin component of the back coat 16, the wear layer 18, and the particles 14 is preferably a vinyl resin, that is, a polymeric material obtained by polymerizing compounds containing at least one —CH=CH$_2$ radical. Useful vinyl resins include homopolymers, such as polyvinyl chloride, polyvinyl acetate, polyvinyl propionate, polyvinyl butyrate, polymerized vinylidene chloride, polymerized acrylic acid, polymerized ethyl acrylate, polymerized methyl acrylate, polymerized propyl acrylate, polymerized butyl acrylate, and the like; copolymers of the above with each other such as vinyl chloride-vinyl acetate copolymer, vinylidene chloride-vinyl chloride copolymer, methyl methacrylate-vinyl chloride copolymer, methyl acrylate-ethyl acrylate copolymer, ethyl acrylate-butyl acrylate copolymer, and the like and copolymers of the above with other monomers copolymerizable therewith, such as vinyl esters, including vinyl bromide, vinyl fluoride, vinyl choroacetate, vinyl alkyl sulfonates, trichloroethylene and the like; vinyl ethers such as vinyl ethyl ether, vinyl isopropyl ether, vinyl chloroethyl ether and the like; cyclic unsaturated compounds such as styrene, chlorostyrene, coumarone, vinyl pyridine and the like; maleic and fumaric acid and their derivatives such as diethyl maleate, dibutyl fumarate and the like; unsaturated hydrocarbon such as ethylene, propylene, butylene and the like; allyl compounds such as allyl acetate, allyl chloride, allyl ethyl ether, and the like; conjugated and cross-conjugated unsaturated compounds such as butadiene, isoprene, chloroprene, 2,3-dimethylbutadiene-1,3, divinyl ketone and the like. The monomers listed hereinabove are useful in preparing copolymers with a vinyl resin and can be used as modifiers in the polymerization, in which case they may be present in an amount of a few percent, or they can be used in larger quantities, up to as high as 40 percent by weight of the mixture to be polymerized. If desired, a mixture of vinyl resins can be used in preparing the layer 18 for use in the invention.

A plasticizer for the vinyl resin is also frequently present in these compositions. Suitable plasticizers for the vinyl resin include ester type plasticizers such as tributyl phosphate, dioctyl phthalate, dipropylene glycol dibenzoate, phenyl phosphate, dibutyl tartrate, amyl tartrate, butyl benzyl benzoate, dibutyl sebacate, dioctyl adipate, didecyl adipate and the like, rubbery plasticizers, such as butadienestyrene copolymer, butadiene-acrylonitrile copolymer, and the like, and other materials which function as plasticizers, such as epoxidized drying oils, aromatic hydrocarbon condensates and the like. Where certain flexible soft vinyl resins are used in formulating these layers, such as polymers containing large proportions of ethyl acrylate, no plasticizer is needed. However, in most instances, a plasticizer is essential in order to impart the necessary properties of flexibility to the dried film.

Likewise, plastisol or organosol dispersions of vinyl resins can be utilized for seal coats on one or both surfaces of substrate 11.

The thickness of the relatively flat, fibrous substrate 11 will depend to a large extent upon the particular product to be made and the particular subsequent use for which it is intended. Normally, a thickness in the range of from about 10 mils to about 90 mils is satisfactory.

Figure 2:
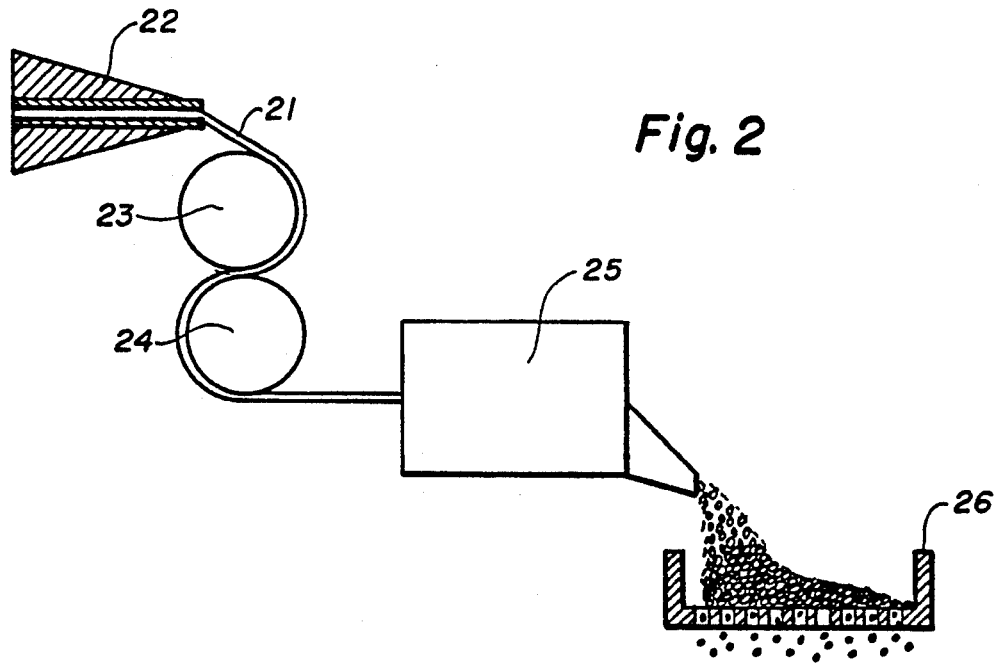
FIG. 2 is a schematic view of the process and equipment for the production of the "stress-induced" polymeric chips used in the process of the invention.

The chips 14 are prepared by the process shown schematically in FIG. 2. Specifically, a polymeric film 21, about 10 inches wide and anywhere from 30–40 mils thick, preferably about 40 mils thick, is extruded through the die 22 of a standard melt extruder, not shown. The film 21 is cooled to a temperature just above its glass transition temperature (about 50° C.) by passing over a conventional, cooled calender roll 23 and then the film is drawn to about one-fourth its original thickness by passing through the nip of roll 23 and stretching roll 24. The stressed film is then led to a slitter, grinder or dicer 25 and sieve 26 to provide "stressed" particles or chips. A typical distribution of stress-induced chips is shown in Table 1 below.

TABLE 1

| Sieve # | Particle Size | | % Retained on Screen |
|---|---|---|---|
| | Inch | Micron | |
| 14 | .0555 | 1410 | 3 |
| 20 | .0331 | 840 | 64 |
| 25 | .0278 | 706 | 14 |
| 50 | .0117 | 297 | 18 |

The chips 14 are usually formulated from polyvinyl chloride having K-values (related to molecular weight, which in turn determines melt characteristics) in the range of 53–73. Resins outside this range perform marginally. If the K-value is above the preferred range, the temperature necessary to melt the resin for extrusion may cause degradation of the polymer. If the K-value is below the range, the "stressed" chips tend not to recoil during the relaxation step. If the chips 14 are formulated from the same polymer as constitutes the polymeric layer 18, the polymer of the chips 14 would have a higher molecular weight than the polymer of layer 18, to enable the chips 14 to "pop" within the softened layer 18 and produce the textured effect. It has been noted that the chips 14 in the textured surface of the product of the present invention tend to display curved or rounded edges when compared to the sharp edged chips that provide the textured surface of prior art products.

A decorative printed image 12 may be applied to the substrate 11 on the coated surface thereof after drying the coating. Printing is conventional and paints and inks normally used for application of a decorative design to a vinyl film or layer are used. The composition is preferably formulated so that the binder of the ink contains an appreciable quantity of a vinyl resin. Suitable vinyl resins include vinyl chloride polymer, vinyl chloride-vinyl acetate copolymer, vinyl chloride-vinyl propionate copolymer, vinyl butyrate polymer, vinylidene chloride polymer, vinylidene chloride-vinyl chloride copolymer, copolymers of vinyl chloride and vinylidene chloride with esters of maleic and fumaric acid, such as dimethyl, diethyl, and dibutyl maleate and fumarate, and the like. Extender resins, such as nitrocellulose or acrylic polymers, can be employed as a portion of the binder of the ink or paint.

The decorative printing composition contains pigments according to the colors desired and is preferably formulated as a solution in the solvent such as cyclohexanone, methyl ethyl ketone, methyl isobutyl ketone and the like.

The decorative printing composition can be applied to the seal coated surface of the sheet in any way appropriate for producing the particular decoration desired. Any of the rotary graphic art printing processes, such as rotogravure, offset printing or lithography, can be used. If desired, the design can be applied by conventional block printing technique.

Figure 3:
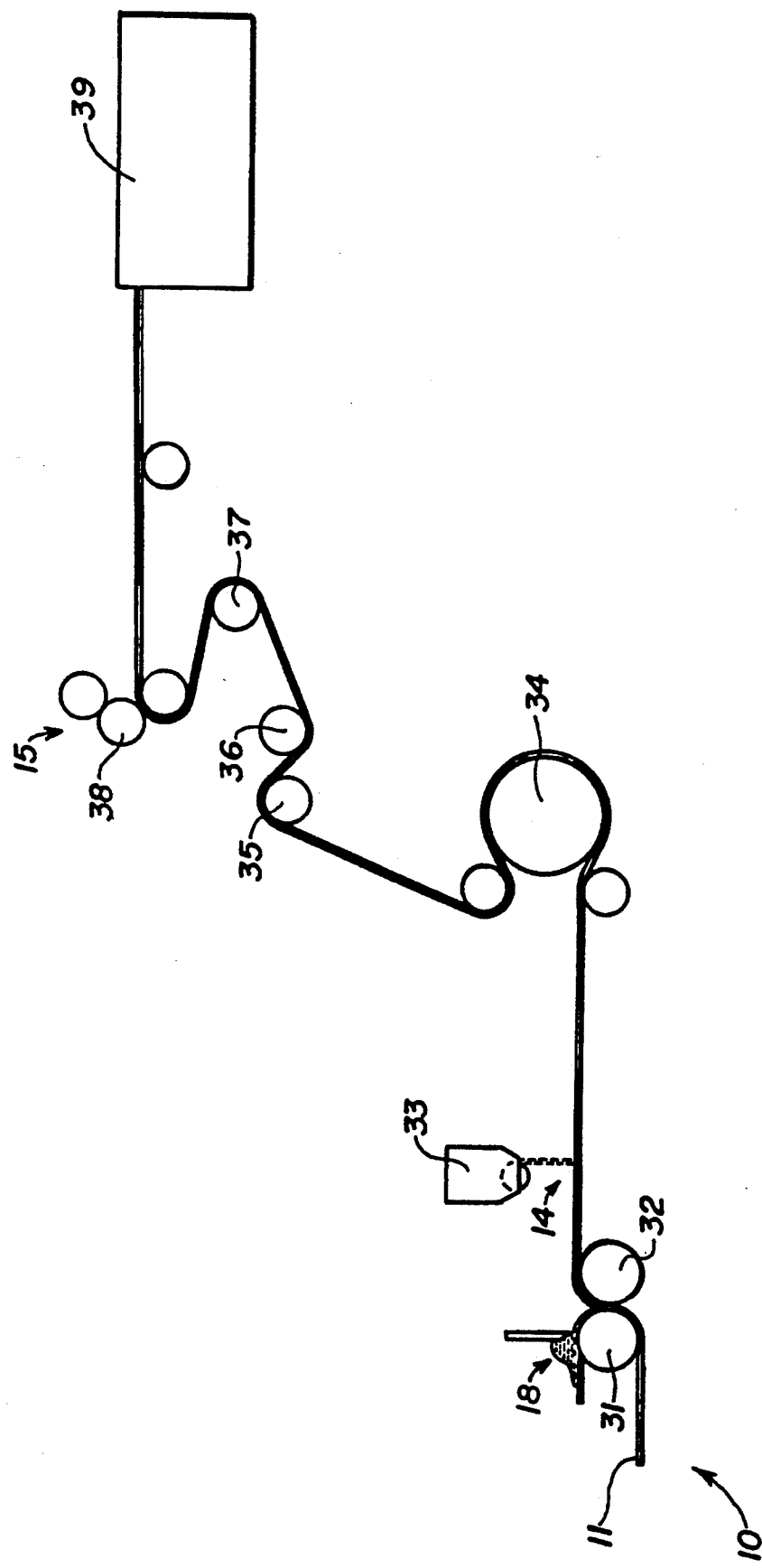
FIG. 3 is a schematic view of the process and equipment used in the manufacture of the product of the invention.

In FIG. 3, a schematic view of the process of this invention, the substrate or backing sheet 11, specifically a saturated-glass substrate, that has been impregnated and hot pressed to form a substantially smooth surfaced sheet, is fed through the nip and around the cylindrical rolls 31 and 32 of an Ulbricht reverse roll coater. The clear viscous liquid plastisol layer 18 is applied to the top surface of the backing sheet 11 to a thickness of 5–60 mils, preferably about 20–30 mils and the coated sheet is passed beneath the outlet of a Shilling feeder 33 containing the specially-prepared, stressed chips 14. The chips 14 are deposited at a rate of about 40 grams/square foot into the plastisol layer 18 in accordance with a predetermined pattern set on the Shilling feeder 33.

The combination of base layer 11 and top layer 18 containing the particles 14 is then led over a heated drum 34 maintained at a temperature of about 320° F. The primary purpose of this step is to insure that substantially all particles 14 will be in a prone position, i.e., in a substantially horizontal plane. The time of exposure to this temperature is selected to cause the particles 14 to become permanently fixed in position. As the gelled substrate of layers 11 and 18, the latter containing the prestressed particles 14, leaves the drum 34, the top surface of the laminate 10 is almost smooth.

After passing through the cooling rolls 35, 36 and 37, the gelled laminate 10 may be further clear coated with a second application of the plastisol used to prepare layer 18 at the Waldron reverse roll coater shown at 38. The sheet is then passed into the oven 39 maintained at a temperature above which the extruded polymeric film was originally stretched but below the melting temperature of the polymer. This exposure permits the chips to become substantially unstressed and tend to return to approximately their original dimensions. In so doing, the chips 14 tend to "pop" as shown in FIG. 1 and provide the laminate with the desired textured surface. The second application of plastisol to layer 18, although not always necessary, assures that the particles in the substantially unstressed condition will be completely coated and also that any recesses in the final product are filled to prevent undue soiling. The laminate is then permitted to cool and, thus, provide the textured surface covering product of this invention.

What is claimed:

1. A wear-resistant product having a textured surface comprising:
   (a) a flexible substrate impregnated with polyvinyl chloride;
   (b) a layer of a synthetic organic polymer or polyvinyl chloride superimposed on said substrate; and
   (c) a plurality of chips of polyvinyl chloride having a K-value of 53–73 distributed throughout and embedded within said organic polymer layer, said chips of polyvinyl chloride having a higher K-value than the polyvinyl chloride of said layer of synthetic organic polymer having been stressed prior to embedding and having been relaxed after embedding to provide a textured, wear-resistant surface of said chips and recesses between chips, said surface being characterized by a polymeric covering of substantially uniform thickness over both said chips and said recesses.

2. A product as in claim 1 wherein said flexible substrate impregnated with polyvinyl chloride is a felted sheet of synthetic or natural material.

* * * * *